United States Patent [19]

Hayashi et al.

[11] Patent Number: 4,515,119
[45] Date of Patent: May 7, 1985

[54] BEARING BEAM STRUCTURE OF AUTOMOTIVE ENGINE

[75] Inventors: Yoshimasa Hayashi, Kamakura; Naoki Ogawa, Yokohama, both of Japan

[73] Assignee: Nissan Motor Company, Limited, Yokohama, Japan

[21] Appl. No.: 470,372

[22] Filed: Feb. 28, 1983

[30] Foreign Application Priority Data

Mar. 4, 1982 [JP] Japan .................................. 57-34245

[51] Int. Cl.$^3$ .......................... F02F 7/00; F02B 77/00
[52] U.S. Cl. ............................. 123/198 E; 123/195 C; 123/195 S
[58] Field of Search ............. 123/198 E, 195 C, 195 S

[56] References Cited

U.S. PATENT DOCUMENTS

| | | | |
|---|---|---|---|
| 2,098,451 | 11/1937 | Gilmore | 29/156.4 |
| 2,865,341 | 12/1958 | Dolza | 121/194 |
| 4,213,440 | 7/1980 | Abe et al. | 123/195 C |
| 4,265,495 | 5/1981 | Backlin | 123/195 C |

FOREIGN PATENT DOCUMENTS

| | | |
|---|---|---|
| 472638 | 4/1947 | Belgium . |
| 0056588 | 7/1982 | European Pat. Off. . |
| 0057869 | 8/1982 | European Pat. Off. . |
| 524880 | 5/1931 | Fed. Rep. of Germany . |
| 2275124 | 1/1976 | France . |
| 1481139 | 7/1977 | United Kingdom . |

OTHER PUBLICATIONS

Ricardo, "The High-Speed Internal-Combustion Engine", article 1941.
Dipl.-Ing. Klaus Schellmann et al., "Der Porsche-V-8-Motor Typ 928", pp. 289-294 (1977).
European Search Report.

Primary Examiner—Ira S. Lazarus
Attorney, Agent, or Firm—Schwartz, Jeffery, Schwaab, Mack, Blumenthal & Koch

[57] ABSTRACT

A bearing beam structure of an automotive internal combustion engine having a cylinder block formed with bearing sections, consists of a plurality of main bearing cap sections each of which associates with each cylinder block bearing section to rotatably support the journal of a crankshaft. First and second side wall sections are provided to be respectively connected with the opposite side portions of each bearing cap section to securely connect the bearing cap sections with each other. Additionally, the first and second side wall sections are respectively formed with first and second transmission installation sections to which a transmission housing is rigidly connected, thereby greatly improving the rigidity of the cylinder block entire while improving the connection-rigidity between the cylinder block and a transmission.

6 Claims, 8 Drawing Figures

FIG.1 (PRIOR ART)
FIG.2 (PRIOR ART)
FIG.3 (PRIOR ART)
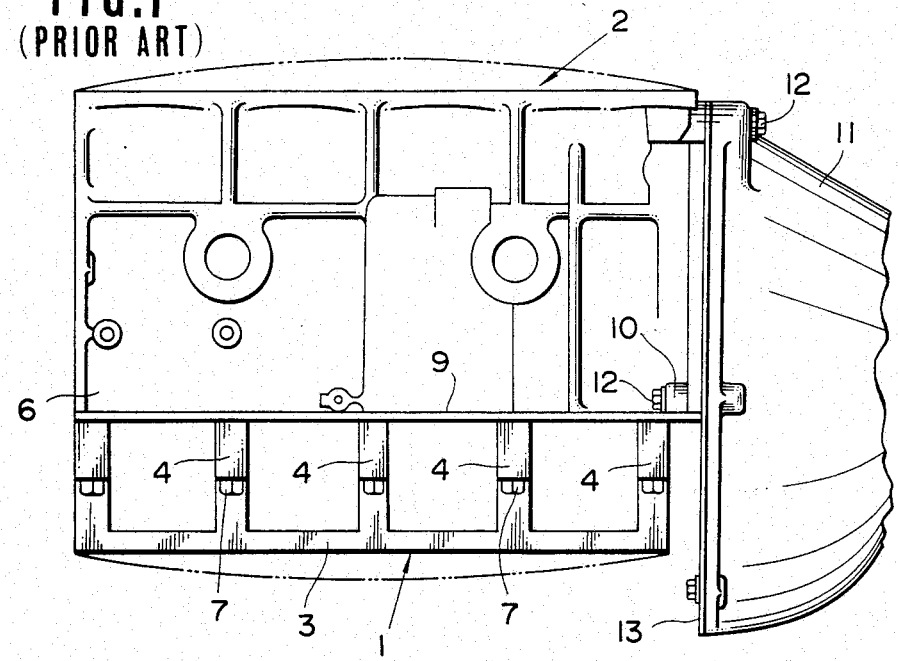
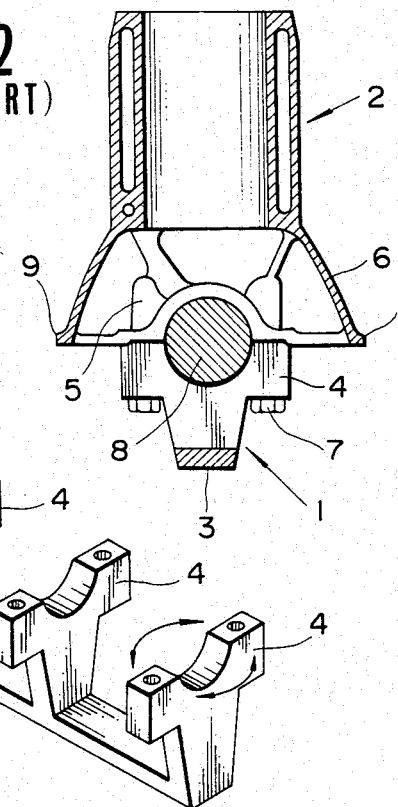
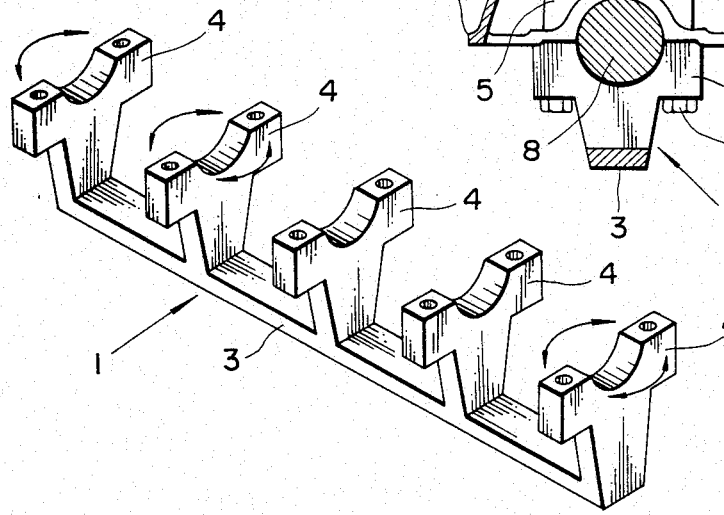

BEARING BEAM STRUCTURE OF AUTOMOTIVE ENGINE

BACKGROUND OF THE INVENTION

1. Field of the Invention

This invention relates to an improvement in a bearing beam structure installed to the bottom part of a cylinder block in order to rotatably support a crankshaft of an automotive internal combustion engine.

2. Description of the Prior Art

In usual automotive internal combustion engines, a crankshaft is rotatably supported through bearing metals by a plurality of bearing sections formed at the bottom part of a cylinder block and a plurality of bearing caps which are secured respectively to the cylinder block bearing sections. The bearing caps are installed in positions separate and independent from each other, and accordingly tend to vibrate in the fore and aft directions (in the direction of the crankshaft axis) to come down under the influence of vibration input from the crankshaft due to combustion impact force. This excites the vibration of the skirt section of a cylinder block, thereby emitting considerable noise. In view of this, a bearing beam structure has been proposed in which a plurality of bearing caps are integrally connected with each other by means of a rigid elongated beam located at the bottom part of each bearing cap section. Such a bearing beam structure is effective for preventing each bearing cap from vibrating in the fore and aft directions, but not effective against, for example, the torsional deformation of the cylinder block around the crankshaft axis, thereby allowing noise generation due to such vibration of the cylinder block.

SUMMARY OF THE INVENTION

A bearing beam structure according to the present invention is secured to the bottom part of a cylinder block of an automotive internal combustion engine. The bearing beam structure comprises a plurality of bearing cap sections each of which associates with a bearing section formed at the bottom part of the cylinder block so as to rotatably support the journal of a crankshaft therebetween. First and second side wall sections are connected respectively with the opposite portions of each bearing cap section to securely connect the bearing cap sections with each other. Additionally the first and second side wall sections are respectively formed with first and second transmission installation sections to which a transmission housing is rigidly connected. The first and second transmission installation sections are located spaced from the cylinder block.

Accordingly, this bearing beam structure is greatly improved in torsional and flexural strength, which greatly contributes to improving the rigidity of the entire cylinder block and suppresses the deformation of the cylinder block skirt section, thereby effectively reducing noise from the engine. Furthermore, the connection-rigidity between the cylinder block and transmission is greatly improved, thereby reducing low frequency noise within the passenger compartment while suppressing noise due to the open and close movement vibration of the transmission housing.

BRIEF DESCRIPTION OF THE DRAWINGS

The features and advantages of the bearing beam structure according to the present invention will be more appreciated from the following description taken in conjunction with the accompanying drawings in which the same reference numerals designate the corresponding parts and element, in which:

FIG. 1 is a front elevation of a cylinder block equipped with a conventional bearing beam structure;

FIG. 2 is a vertical sectional view of the cylinder block of FIG. 1;

FIG. 3 is a perspective view of the conventional bearing beam structure of FIG. 1;

DETAILED DESCRIPTION OF THE INVENTION

Figure 4A:
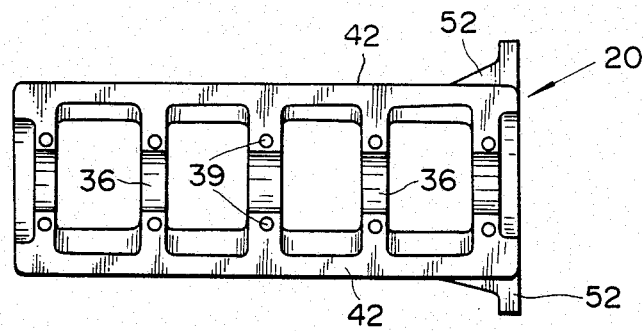
FIGS. 4A, 4B and 4C are plan view, front view, and bottom view, respectively, of a preferred embodiment of a bearing beam structure in accordance with the present invention.
Figure 4B:
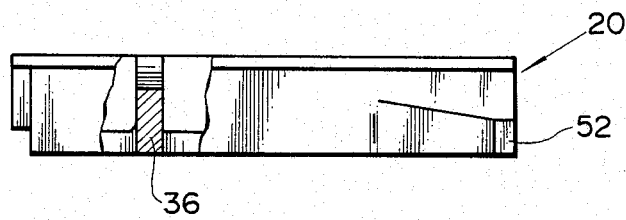
Figure 4C:
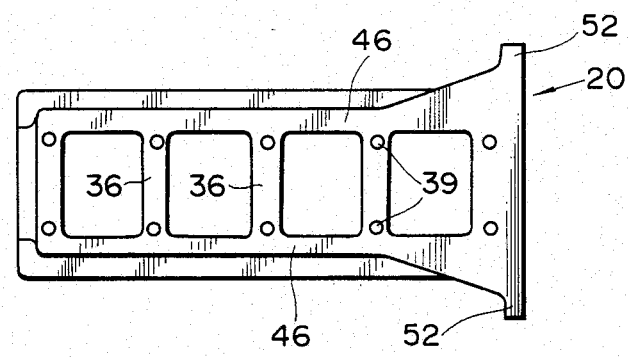

Referring to FIGS. 1 to 3, a conventional bearing beam structure of an automotive internal combustion engine will be described along with its major shortcomings. The bearing beam structure 1 is securely installed to the bottom part of a cylinder block 2 of the engine and includes a beam section 3 which integrally connects a plurality of bearing cap sections 4 with each other in the fore and aft directions of the engine, thus forming a bearing beam structure of the one-piece type. The bearing cap sections 4 are respectively secured to the bearing sections 5 of the cylinder block 2 by means of bolts 7, so that a crankshaft 8 is rotatably supported by the cylinder block bearing sections and the bearing beam structure bearing cap sections.

With such a bearing beam structure, the bearing cap sections are prevented from moving by virtue of the beam section 3 and therefore each bearing cap section 4 is suppressed in its coming down vibration (vibration in the fore and aft directions). Additionally, the cylinder block 2 is improved in rigidity against flexure indicated in phantom lines in FIG. 1, thus suppressing the vibration of the skirt section 6 of the cylinder block 2. This reduces noise emission from the cylinder block skirt section 6.

However, the above-mentioned bearing beam structure 1 has encountered the following shortcomings: The bearing beam structure 1 is not effective for suppressing torsional deformation of the cylinder block 2 around the crankshaft 8 since the bearing cap sections 4 are connected only at their bottom end portion with each other. Besides, the bearing beam structure 1 is not so effective for suppressing flexure applied to each bearing cap section around the axis of each cylinder bore as indicated by arrows in FIG. 3. Thus, the cylinder block 2 and the bearing beam structure 1 emit vibration noise due to such deformations, not giving a sufficient engine noise reduction.

Additionally, the cylinder block 2 is usually formed at its lower-most part with oil pan installation flanges 9 which are further respectively formed at their rear end section with transmission installation sections 10 to which a transmission housing 11 is rigidly connected. More specifically, the peripheral section of an open end of the transmission housing 11 is rigidly connected at its opposite side portions with the transmission installation sections 10 of the cylinder block 2, and at its upper portion with the cylinder block in the vicinity of the top thereof, through a rear plate 13 by means of connection with bolts 12, so that the tramsmission housing 11 is rigidly connected with the cylinder block 2 as a single block.

However, as seen from FIG. 1, since the transmission housing 11 is supported only at its relatively upper part by the cylinder block 2, the surface area of connection between the cylinder block 2 and the transmission housing 11 is less. As a result, the angular displacement of the cylinder block 2 tends to occur relative to the transmission housing 11, so that the connecting section between the cylinder block 2 and the transmission housing 11 is lower in flexural and torsional rigidities, thereby generating low frequency noise within a passenger compartment of a vehicle. Furthermore, the transmission housing 11 is not prevented from undergoing open and close movement vibration, constituting a major source of engine noise.

In view of the above description of the conventional bearing beam structure, reference is now made to FIGS. 4A to 4C and 5, wherein a preferred embodiment of a bearing beam structure 20 of the present invention is shown in combination with a cylinder block 22 of an automotive internal combustion engine. The cylinder block 22 is formed with a plurality of cylinder barrels 24 each of which defines therein a cylinder bore (no numeral). The cylinder block includes a skirt section 26 which is bulged outwardly and extends downwardly to define thereinside an upper part of a crankcase (no numeral). The skirt section 26 is integrally connected through a lower block deck 28 with the cylinder barrels 24. A plurality of main bearing bulkheads 30 are aligned parallel with each other and located inside the skirt section 26. Each bearing bulkhead 30 is located below and connected to a portion between the adjacent two cylinder barrels 24. The bearing bulkhead 30 is integrally connected at its top part with the lower block deck 28 and at its side parts with the inner wall of the skirt section 26. Each bearing bulkhead 30 is provided at its bottom central portion with a bearing section 32 defining a bore 34 in which the journal of a crankshaft (only its axis X is shown) is rotatably disposed.

The bearing beam structure 20 is securely connected to the bottom part of the cylinder block 22 and includes a plurality of main bearing cap sections 36. Each bearing cap section 36 defines the bore 34 and is secured onto a bearing bulkhead 30 by means of cap bolts 38 so as to associate with a bearing section 32 of the bearing bulkhead 30, thereby rotatably supporting the journal of the crankshaft in the bore 34. The cap bolts 38 respectively pass through bolt holes 39 of the bearing cap sections 36.

All the bearing cap sections 36 are integrally connected with each other by two side wall sections 40A, 40B which are generally vertical and form opposite side walls of the bearing beam structure 20. The two side wall sections 40A, 40B extend parallel along the crankshaft axis X and are located at or formed respectively along the opposite side portions of each bearing cap section 36. The two side wall sections 40A, 40B are located symmetrical with each other with respect to a vertical plane (not shown) containing the crankshaft axis X. These side wall sections 40A, 40B are formed respectively with flanges 42 which are secured to the bottom end portion of the cylinder block skirt section 26, thus forming part of a crankcase.

Figure 5:
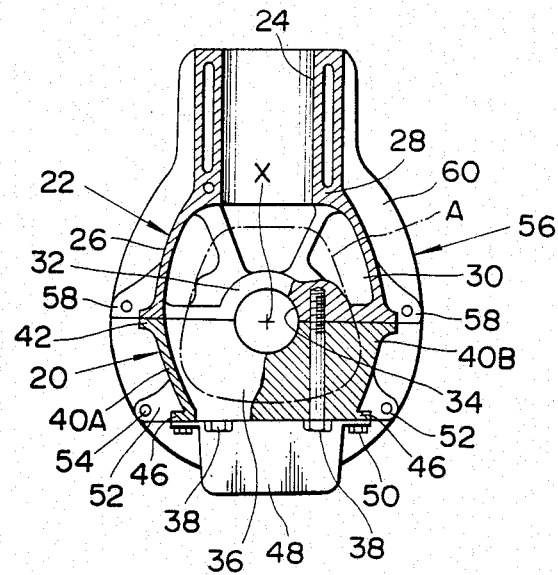
FIG. 5 is a vertical sectional view of an automotive internal combustion engine consisting of the bearing beam structure of FIGS. 4A to 4B.

The bearing beam structure 20 is formed at its bottom end surface with flanges 46 to which an oil pan 48 is installed by means of bolts 50 threaded into the flange 46 as shown in FIG. 5. The bearing beam structure 20 of this embodiment is produced by being integrally cast using, as its material, light alloy such as aluminum alloy so that the bearing beam structure is of the one-piece type.

In addition, each side wall section 40A, 40B is formed at its bottom rear end part with a transmission installation section 52 which is continuous from and integral with the oil pan installation flange 46. Each transmission installation section 52 projects laterally and outwardly from the cylinder block 22 and is formed with a bolt hole 54. The installation section 52 is rigidly connected to a relatively lower part of the peripheral section of the open end of a transmission housing 56, in which a transmission mechanism is disposed, by means of bolt-connections with bolts passing through the holes 54. In this connection, the cylinder block 22 is also formed at its bottom part with two transmission installation sections 58, 58 which are oppositely located and rigidly connected to relatively upper parts of the peripheral section of the open end of the transmission housing 56. Accordingly, the transmission installation section 52 of the bearing beam structure 20 is located spaced or separate from the corresponding transmission installation section 58 of the cylinder block 22. In other words, the peripheral section of the transmission housing open end is securely supported at its relatively upper part by the transmission installation sections 58 of the cylinder block 22 and at its relatively lower part by the transmission installation sections 52 of the bearing beam structure 20. The reference numeral 60 denotes a rear plate interposed between the cylinder block 22 and the transmission housing 56. Indicated by a phantom line A is the envelope of the outer-most loci of the big end of a connecting rod (not shown).

With the thus arranged bearing beam structure 20, each bearing cap section 36 is of course suppressed in its comming down vibration in the fore and aft directions. Additionally, each bearing cap section 36 is greatly improved in strength against bending force applied around the axis of each cylinder bore by virtue of the side wall sections 40A, 40B, thereby effectively suppressing torsional and flexural vibrations of each bearing section 32. As a result, noise emission from the cylinder block skirt section 26 is reduced. Furthermore, the entire cylinder block 22 is improved in strength against torsion around the crankshaft axis X, and the cylinder block skirt section 26 is prevented from undergoing open and close movement or deformation. The combined effect effectively suppresses noise generation and emission from the engine. Furthermore, since the side wall sections 40A, 40B are rigidly connected through the transmission installation sections 52 with the transmission housing 56, its rigidity is largely increased, thereby further effectively achieving vibration suppression thereof. Moreover, by virtue of the fact that the bearing beam structure 20 forms part of the crankcase, the oil pan 52 is small, thereby noticeably reducing noise generation from the oil pan 52.

As a result of the connection of the bearing beam structure transmission installation sections 52 and the transmission housing 56, the connection-rigidity between the cylinder block 22 and transmission is improved thereby reducing low frequency noise generated within the vehicle passenger compartment which noise is due to low connection-rigidity. Additionally, the open end section of the transmission housing is also suppressed in its open and close movement vibration, thus preventing noise generation from the transmission housing.

Figure 6:
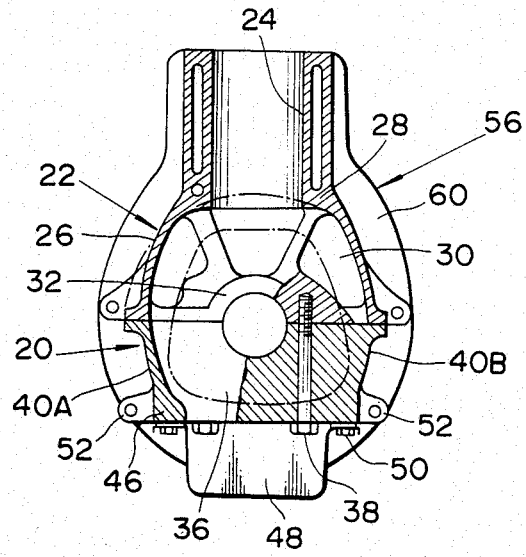
FIG. 6 is a vertical sectional view similar to FIG. 5, but showing another embodiment of the bearing beam structure in accordance with the present invention.

FIG. 6 shows another embodiment of the bearing beam structure 20 in accordance with the present invention, in which the oil pan installation flanges 46 are formed larger in sectional area than those in the embodiment of FIG. 5. With this embodiment, the bearing beam structure 20 can be further improved in its flexural and torsional rigidities. Additionally, since the transmission housing 56 is connected directly to these high rigidity flanges 46, a further noise reduction can be achieved.

As will be appreciated from the above, the bearing beam structure according to the present invention effectively suppresses torsional vibration and the like of each bearing cap section, and therefore greatly improves the rigidity of the cylinder block entire. Futhermore, it is improved in connection-rigidity to the transmission, thereby reducing low frequency noise generated within the passenger compartment while suppressing the open and close movement vibration of the transmission housing. As a result, a further noise reduction can be achieved as compared with the case where a conventional bearing beam structure is used. Moreover, the improved connection-rigidity between the cylinder block and the transmission results in a rise in critical rotational speed of the propeller shaft (not shown).

What is claimed is:

1. A bearing beam structure of an automotive internal combustion engine having a cylinder block formed with a plurality of bearing sections, said bearing beam structure comprising:

a plurality of main bearing cap sections each of which associates with one of said cylinder block bearing sections to rotatably support the journal of a crankshaft;

first and second side wall sections respectively connected with the opposite side portions of each bearing cap section to securely connect said bearing cap sections with each other, each of said first and second side wall sections extending from a top portion to a bottom portion of each of said bearing cap sections, and being in contact with said cylinder block; and first and second transmission installation sections to which a transmission housing is securely connected, said first and second transmission installation sections being formed respectively at said first and second side wall sections and located spaced from the cylinder block.

2. A bearing beam structure as claimed in claim 1, wherein said first and second transmission installation sections are located opposite to each other relative to a vertical plane containing the axis of a crankshaft and extend outwardly in opposite directions.

3. A bearing beam structure as claimed in claim 2, wherein said first and second transmission installation sections are located at the bottom part of a bearing beam structure and rigidly connected to a lower part of a peripheral section of an open end of said transmission housing.

4. A bearing beam structure as claimed in claim 3, wherein said first and second side wall sections are integral with each bearing cap section and extend along an axis of said crankshaft, said first and second side wall sections being located generally symmetrical with each other relative to a vertical plane containing the crankshaft axis.

5. A bearing beam structure as claimed in claim 4, wherein said first and second side wall sections are formed with a bottom part with lower flanges to which an oil pan is to be securely connected, said lower flanges being integral respectively with said first and second transmission installation sections.

6. A bearing beam structure as claimed in claim 5, wherein said first and second side wall sections are respectively formed with an upper part with upper flanges which are to be rigidly connected with the cylinder block.

* * * * *